(12) United States Patent
Andersen et al.

(10) Patent No.: US 6,800,258 B2
(45) Date of Patent: Oct. 5, 2004

(54) APPARATUS FOR PRODUCING HYDROGEN

(76) Inventors: Erling Reidar Andersen, 0/s Thor Andersen, Gluppeveien 35, 1614 Frederikstad (NO); Erling Jim Andersen, P.O. Box 743, New Denmark, N w Brunswick (CA), E7G 4H3

(*) Notice: Subject to any disclaimer, the term of this patent is extended or adjusted under 35 U.S.C. 154(b) by 0 days.

(21) Appl. No.: 10/287,720

(22) Filed: Nov. 5, 2002

(65) Prior Publication Data

US 2003/0118505 A1 Jun. 26, 2003

Related U.S. Application Data

(62) Division of application No. 09/620,250, filed on Jul. 20, 2000, now Pat. No. 6,506,360.

(51) Int. Cl.[7] ................................ B01J 8/00; B01J 7/00
(52) U.S. Cl. ...................... 422/211; 422/305; 422/261; 422/129; 422/105; 422/116; 422/237; 48/61
(58) Field of Search .............................. 423/648.1, 657; 422/105, 116, 211, 219, 232, 237, 239, 261, 294, 221, 120, 122, 129; 48/61, 62 R; 74/3.54, 3.56

(56) References Cited

U.S. PATENT DOCUMENTS

| | | | | |
|---|---|---|---|---|
| 47,205 A | * | 4/1865 | Hinkel et al. ............... | 422/237 |
| 254,189 A | * | 2/1882 | Berland ........................ | 48/116 |
| 436,812 A | * | 9/1890 | Tallmadge ................... | 48/118 |
| 490,437 A | | 1/1893 | Hawkins | |
| 767,289 A | | 8/1904 | Kirkwood | |
| 909,536 A | | 9/1909 | Brindley | |
| 934,036 A | | 9/1909 | Brindley | |
| 978,641 A | * | 12/1910 | Poe ............................ | 422/112 |
| 1,504,546 A | * | 8/1924 | Curtis ......................... | 99/336 |
| 1,916,473 A | | 7/1933 | Forrest | |
| 2,062,609 A | * | 12/1936 | Reid ........................... | 422/237 |
| 2,688,912 A | * | 9/1954 | Laneri ......................... | 99/336 |
| 2,721,789 A | | 10/1955 | Gill ............................. | 23/282 |
| 3,348,919 A | | 10/1967 | Shumway .................... | 23/211 |
| 3,542,524 A | * | 11/1970 | Kimble et al. ............. | 422/120 |
| 3,554,707 A | | 1/1971 | Holmes ....................... | 23/282 |
| 3,561,926 A | * | 2/1971 | McElroy ..................... | 422/212 |
| 3,777,692 A | * | 12/1973 | Baccaglini et al. ......... | 114/54 |
| 3,890,102 A | * | 6/1975 | Gathmann et al. ......... | 422/220 |
| 3,942,511 A | | 3/1976 | Black et al. ............... | 126/248 |

(List continued on next page.)

FOREIGN PATENT DOCUMENTS

| | | |
|---|---|---|
| CA | 2116468 | 10/1998 |
| CA | 2225978 | 6/1999 |
| DE | 2436002 | 12/1976 |
| DE | 3401194 | 7/1985 |
| EP | 312078 | 4/1989 |
| FR | 2465683 | 4/1981 |
| JP | 401208301 | 2/1988 |
| WO | WO 94/18117 | 8/1994 |

OTHER PUBLICATIONS

Stockburger, D. et al., "On–line Hydrogen Generation form Aluminum in an Alkaline Solution", Proc.–Electrochem. Soc. (1992), 92–5 (Proc. Symp. Hydrogen Storage Mater., Batteries, Electrochem., 1991), 431–44, 1992, XP–001032928.

Belitsus, David: "Reaction of Aluminum with Sodium Hydroxide Solution as a Source of Hydrogen", J. Electrochem. Soc. (1970), (Aug.), 1097–9, 1970, XP– 002180270.

*Primary Examiner*—Hien Tran
*Assistant Examiner*—Jennifer A. Leung
(74) *Attorney, Agent, or Firm*—Mario Theriault (57) ABSTRACT

The process for producing hydrogen gas according to the present invention consists of reacting aluminum with water in the presence of sodium hydroxide as a catalyst. An apparatus for carrying out the method is also described. The apparatus comprises an expandable container wherein the pressure and temperature of the reaction causes the container to expand and contract to control the degree of immersion of a fuel cartridge in water and consequently to control the intensity and duration of the reaction.

11 Claims, 8 Drawing Sheets

U.S. PATENT DOCUMENTS

| | | | |
|---|---|---|---|
| 3,957,483 A | 5/1976 | Suzuki | 75/0.5 R |
| 3,975,913 A | 8/1976 | Erickson | 60/645 |
| 4,223,661 A | 9/1980 | Sergev et al. | 126/204 |
| 4,269,818 A | 5/1981 | Suzuki | 423/657 |
| 4,340,580 A | 7/1982 | Suzuki | 423/657 |
| 4,598,552 A | 7/1986 | Weber | 60/673 |
| 4,643,166 A | 2/1987 | Hubele et al. | 126/263 |
| 4,670,018 A | 6/1987 | Cornwell | 44/1 E |
| 4,730,601 A | 3/1988 | Hubele et al. | 126/263 |
| 4,752,463 A | 6/1988 | Nagira et al. | 423/657 |
| 4,769,044 A | 9/1988 | Cornwell | 44/605 |
| 4,882,128 A | 11/1989 | Hukvari et al. | 422/119 |
| 5,143,047 A | 9/1992 | Lee | 126/263 |
| 5,286,473 A | 2/1994 | Hasebe | 423/657 |
| 5,833,934 A | 11/1998 | Adlhart | 422/239 |
| 5,867,978 A | 2/1999 | Klanchar et al. | 60/39.182 |

* cited by examiner

APPARATUS FOR PRODUCING HYDROGEN

This is a division of U.S. patent application Ser. No. 09/620,250 filed on Jul. 20, 2000, now U.S. Pat. No. 6,506,360.

FIELD OF THE INVENTION

This invention relates to the production of hydrogen gas from aluminum, water, and sodium hydroxide as catalyst, and to an apparatus for carrying out the method.

BACKGROUND OF THE INVENTION

Generally speaking, it is known that under certain conditions, aluminum reacts with water to generate hydrogen and heat. It is also known, however, that this type of reaction is not sustainable at ambient temperature. It is believed that a protective oxide layer forms on a metal surface in contact with water at ambient temperature and hampers the reaction. Therefore, it has been accepted by those skilled in the art that the use of aluminum in a reaction with water to generate heat and hydrogen gas requires that the protective oxide layer is efficiently and continuously removed, and that the reaction is kept at an elevated temperature.

A number of hydrogen generators have been developed in the past. The following patent documents constitute a good inventory of the devices and methods of the prior art in the field of hydrogen gas generation using the reaction of aluminum or alloys of aluminum with water.

U.S. Pat. No. 909,536 issued on Jan. 12, 1909, and U.S. Pat. No. 934,036 issued on Sep. 14, 1909, both issued to G. F. Brindley et al. These documents disclose several compositions for generating hydrogen. The compositions comprise any metal which can form an hydroxide when it is brought into contact with a solution of a suitable hydroxide. For example, aluminum is reacted with sodium hydroxide to release hydrogen and produce sodium aluminate.

U.S. Pat. No. 2,721,789, issued on Oct. 25, 1955 to Q. C. Gill. This document discloses the structure of an hydrogen generator for reacting water with a measured dry charge of aluminum particles and flakes of sodium hydroxide. The reaction releases hydrogen gas and produces sodium aluminate.

U.S. Pat. No. 3,554,707 issued on Jan. 12, 1971 to W. A. Holmes et al. This document discloses a gas generator having bellows to raise or lower the level of water in response to the pressure inside the generator. As the level of water drops, the contact surface between the fuel cartridge and the water is lost and the reaction is terminated.

U.S. Pat. No. 3,957,483 issued on May 18, 1976 to M. Suzuki. This patent discloses a magnesium composition which produces hydrogen upon contact with water. The preferred magnesium composition comprises magnesium, and one or more metals selected from the group consisting of iron, zinc, chromium, aluminum and manganese.

U.S. Pat. No. 3,975,913 issued on Aug. 24, 1976 to D.C. Erickson. This document discloses a hydrogen generator wherein molten aluminum is reacted with water. The generator is kept at a very high temperature to keep the metal in a molten condition.

U.S. Pat. No. 4,643,166 issued on Feb. 17, 1987, and U.S. Pat. No. 4,730,601 issued on Mar. 15, 1988 both to H. D. Hubele et al. These documents disclose the structure of a fuel cell for producing heat energy and hydrogen gas. The device has a reaction chamber containing a fuel composition that is reactive with water. The fuel composition includes a main fuel part of magnesium and aluminum in a molar ratio of 1:2, and the second part is composed of lithium hydride, magnesium and aluminum in equal molar ratio.

U.S. Pat. No. 4,670,018 issued on Jun. 2, 1987, and U.S. Pat. No. 4,769,044 issued on Sep. 6, 1988, both to J. H. Cornwell. These documents describe a log made of compressed wood waste and paper. The log is coated with aluminum particles. Upon burning, the aluminum particles react with moisture in the log to emit heat due to the generation of hydrogen gas.

U.S. Pat. No. 4,752,463 issued on Jun. 21, 1988 to K. Nagira et al. This document discloses an alloy which reacts with water for producing hydrogen gas. The alloy material comprises essentially aluminum and 5 to 50% tin.

U.S. Pat. No. 5,143,047 issued on Sep. 1, 1992 to W. W. Lee. This document discloses an apparatus and a method for generating steam and hydrogen gas. In this apparatus, an aluminum or aluminum alloy powder is reacted with water to generate hydrogen gas. An electric power source is used to start the reaction. The electric power source is used to explode an aluminum conductor and to disperse pieces of molten aluminum into a mixture of water and aluminum powder. A heat exchanger is provided to extract useful heat.

U.S. Pat. No. 5,867,978 issued on Feb. 9, 1999 to M. Klanchar et al. This document discloses another hydrogen gas generator using a charge of fuel selected from the group consisting of lithium, alloys of lithium and aluminum. The charge of fuel is molten and mixed with water to generate hydrogen gas.

JP 401,208,301 issued to Mito on Aug. 22, 1989. This document discloses a process for producing hydrogen. Aluminum is reacted with water under an inactive gas or a vacuum to produce hydrogen gas.

CA 2,225,978 published on Jun. 29, 1999 by J. H. Checketts. This patent application discloses a hydrogen generation system wherein a coating on reactive pellets is selectively removed to expose the reactive material to water for producing hydrogen gas on demand. In one embodiment, aluminum and sodium hydroxide are reacted with water to release hydrogen gas and produce sodium aluminate.

Various other processes to produce hydrogen gas have been described in the art, as reacting water with magnesium, sodium, potassium, lithium, calcium, iron, zinc or steel.

Although the hydrogen production processes of the prior art deserve undeniable merits, it is believed that the catalytic reaction of aluminum and water, using sodium hydroxide as the catalyst, to release hydrogen gas from water at room temperature has never been anticipated or observed and disclosed by prior inventors. It is also believed that the prior art is short of suggestion with regards to a hydrogen production process which can be improvised in a home workshop using common materials and equipment, to generate heat and light during a power outage for example.

Concerning hydrogen generators, the prior art discloses a number of hydrogen generators for use with fuel cells or as heat sources for thermal engines for examples. These generators are believed to be complicated and precarious to operate by untrained individuals. These hydrogen generators are believed to be designed for use by scientists and other professionals working under laboratory conditions.

As such, it will be appreciated that there continues to be a need for a production process and for an apparatus for generating hydrogen gas and heat using a simple reaction which can be started at room temperature and carried out safely by ordinary persons not having a formal education in chemistry and chemical processes.

SUMMARY OF THE INVENTION

Broadly stated, the process for producing hydrogen gas according to the present invention consists of reacting aluminum with water in the presence of sodium hydroxide as a catalyst. This process is advantageous for being carried out at room temperature and for producing large quantities of heat and hydrogen gas at high purity.

In accordance with another feature of the present invention, there is provided a process for producing heat, light and hydrogen gas. The process comprises the steps of providing an expandable receptacle; partly filling the expandable receptacle with water and introducing an aluminum element and a catalyst in the water. The process also comprises the steps of partly sealing the expandable receptacle and reacting the aluminum element with the water. Then, the expandable receptacle is expanded and contracted in response to more or less pressure therein, and by the same action, the fuel element is emerged out or immersed into the water. This method is advantageous for providing the ability to control the intensity of the reaction between the water and the aluminum element in response to the pressure generated inside the expandable receptacle by the reaction.

In another aspect of the present invention, the aluminum element comprises a coiled strip of aluminum having several layers set vertically in the water. As hydrogen gas is generated between the layers of the coiled strip of aluminum, the hydrogen gas raising to the top of the water causes a partial vacuum between the layers of the coiled strip, to absorb more water through the bottom of the coiled strip, thereby promoting an effective wetting of the aluminum element.

In yet another aspect of the present invention, there is provided an apparatus for producing heat, light and hydrogen gas. The apparatus comprises essentially an expandable receptacle having an upper end, a central portion and a fuel element suspended to the upper end and inside the central portion. The apparatus also has means for raising and lowering the fuel element in the central portion in response to more or less pressure inside the expandable receptacle, respectively.

The apparatus according to the present invention uses the pressure and temperature of a reaction occurring between a fuel element and the water contained therein to control the degree of immersion of a fuel element in the water and consequently to control the intensity and duration of the reaction between the fuel element and the water.

In yet a further feature of the present invention, the apparatus comprises a timer mechanism and latch means responsive to the timer mechanism for timely raising the fuel element out of the water contained in the receptacle.

The processes and apparatus according to the present invention are practical and safe for use by the general public to generate heat, light and hydrogen gas in power outage situations for example, or in remote locations where electricity is not available. Furthermore, the method and apparatus according to the present invention use aluminum waste readily available in domestic garbage and metal working shops, to promote recycling and energy conservation.

In accordance with yet another aspect of the present invention, there is provided a process for producing alumina, comprising the step of reacting aluminum with water in the presence of a catalyst wherein the catalyst is sodium hydroxide. This process is advantageous for extracting available energy from a reaction between aluminum waste and water, and for simultaneously producing a basic material which can be reused for manufacturing new aluminum.

Although, the utility of the processes and apparatus of the present invention can be appreciated by the general public, it is also believed that the processes and apparatus of the present invention will find advantageous applications in other more scientific fields, such as the fields of fuel cells, internal combustion engines, thermal engines, heating systems and lighting appliances.

Other advantages and novel features of the present invention will become apparent from the following detailed description of the preferred embodiment.

BRIEF DESCRIPTION OF THE DRAWINGS

A preferred embodiment of the present invention selected by way of examples will now be described with reference to the accompanying drawings, in which.

DETAILED DESCRIPTION OF THE PREFERRED EMBODIMENT

While this invention is susceptible of embodiments in many different forms, there is shown in the drawings and will be described in details herein a specific embodiment of the method and apparatus according to the present invention, with the understanding that the present disclosure is to be considered as an example of the principles of the invention and is not intended to limit the invention to the embodiment illustrated.

The production of hydrogen gas according to the present invention is obtained by a reaction of aluminum with water in the presence of sodium hydroxide (NaOH) as a catalyst. The reaction produces a large amount of heat and hydrogen gas.

The catalyst is mixed with tap water in a proportion of about 225 g. per liter of water. In other words, the sodium hydroxide content of the catalytic solution is preferably about 18% by weight. The catalyst is not chemically consumed in the process.

The aluminum used in the reaction comprises aluminum foil, electrical wire, beverage cans and other similar aluminum waste. The intensity of the reaction depends upon the surface of contact between the aluminum and water. Aluminum foil for example reacts faster than a heavy gauge aluminum wire, and aluminum in a powdered form reacts instantly to produce hydrogen gas.

A series of eight experiments was carried out to measure the volume of hydrogen gas produced in a typical reaction. In these experiments, aluminum foil from Reynolds Aluminum Company of Canada was loosely crumpled and placed in a one liter plastic bottle containing 500 ml of catalytic solution. The bottle was quickly capped with a cover fitted with a tube which led to an inverted volumetric cylinder filled with water. The bottle was immersed in a water bath to prevent overheating.

The volume of water displaced by the gas produced was measured and corrected to a gas volume at standard temperature and pressure (STP). Atmospheric pressure on that day was obtained from a local weather office. The corrected volume of gas produced was compared to the theoretical quantity of hydrogen gas, which would be obtained according to the equation, $$2Al + 3H_2O \xrightarrow{\phantom{catalyst = NaOH}} Al_2O_3 + 3H_2$$

catalyst = NaOH

These experiments were carried out at a room temperature of 21° C. and an atmospheric pressure of 758 mm of Hg. In all cases the reaction started in few seconds and continued for few minutes, until depletion of the aluminum foil. It was noticed that a typical reaction with less than 5 grams of loosely crumpled aluminum foil, is complete in less than 5 minutes. The results of these experiments are shown in Table 1 below.

TABLE 1

Hydrogen Gas Production from Aluminum Foil

| Exp. (#) | Al (g.) | $H_2$ (l) | $H_2$ (l) (STP) | $H_2$ (l) Theoretical | Yield (%) | Deviation (+/− %) |
|---|---|---|---|---|---|---|
| 1 | 2.08 | 2.94 | 2.71 | 2.59 | 104 | 2.6 |
| 2 | 2.03 | 2.85 | 2.62 | 2.53 | 104 | 2.6 |
| 3 | 2.21 | 3.05 | 2.81 | 2.75 | 102 | 2.5 |
| 4 | 2.16 | 2.9 | 2.67 | 2.69 | 99 | 2.6 |
| 5 | 2.2 | 3.04 | 2.8 | 2.74 | 102 | 2.5 |
| 6 | 2.21 | 3.04 | 2.8 | 2.76 | 102 | 2.5 |
| 7 | 0.73 | 1.03 | 0.94 | 0.91 | 103 | 2.4 |
| 8 | 0.83 | 1.15 | 1.05 | 1.03 | 102 | 2.2 |
| Ave. | | | | | 102 | 2.47 |

The results from Table 1 show that the reaction is reproducible and produces stoichiometric quantities of hydrogen gas. The 102% average yield of hydrogen gas is considered to be within the measurement uncertainty; however, there are at least two factors which might have contributed to a slightly higher hydrogen yield. Firstly, the volume of gas produced was corrected to STP. It is possible that the exhausted fume hood in which the experiments were carried out could have lowered the reaction pressure below the atmospheric pressure of 758 mm of Hg. This would have increased the observed value for the volume of gas produced. An exhaust bench typically runs at 1 inch or 2 inches of water pressure. At a maximum, this could have increased the measured volume by about 0.5%. Secondly, the water used was tap water in all cases, in which dissolved air may have been present. If any of this air had been released in the presence of the warm hydrogen gas, this would have increased the volume of gas measured. This would have affected the results by less than 1%. Since the results are within the measurement error, and quantification of these two sources of error would not significantly affect the results, no further experiment was carried out in this area.

The procedure used in the above experiments was repeated, with the exception that the tube leading from the top of the reaction bottle was connected to a gas sampling bag. Two samples of gas were obtained and analysed. The results are presented in Table 2.

TABLE 2

Gas Analysis

| Sample | Hydrogen Concentration | Oxygen & Nitrogen |
|---|---|---|
| 1 | 92% | balance |
| 2 | 98% | balance |

Table 2 shows that the purity of the hydrogen collected in the second sample was 98%. This is close to what was theoretically expected. The lower 92% concentration observed in the first sample was probably due to the fact the system was not completely purged with hydrogen before the sample was taken. By the time the second sample was taken, most of the air had been purged from the tube and the reaction bottle.

The procedure used in the first mentioned experiments was repeated except that the reaction bottle was placed in a water bath before the aluminum was added to the water, and the hydrogen produced was bubbled through the bath water. The temperature of the bath and the catalytic solution were measured before and after the reaction, and at about four minutes after the reaction was completed.

The water equivalent of the plastic containers for absorbing heat and their specific heat were determined experimentally by adding a known quantity of hot water to the reaction system at room temperature and then calculating the heat transfer based on the final temperature.

The quantity of heat produced by the reaction was determined and compared with the theoretical values. The results are shown in Table 3.

TABLE 3

Heat of the Reaction

| Readings | Temp. ° C. Reactor Start | Temp. ° C. Bath Start | Temp. ° C. Reactor Finish | Temp. ° C. Bath Finish | Time |
|---|---|---|---|---|---|
| 1 | 21.1 | 20.2 | 45.5 | 24.4 | 5.29 |
| 2 | 21.1 | 20.2 | 38.3 | 25.3 | 5.33 |

TABLE 3-continued

|  |  | Heats of Formation $Al_2O_3$ kcal/mole | Heat of the Reaction Heat of Formation $H_2O$ kcal/mole | Heat Output Actual kcal | Heat Output Theoretical kcal | Efficiency (%) |
| --- | --- | --- | --- | --- | --- | --- |
| Readings | Al (g) | | | | | |
| 1 | 9.52 | −400.5 | −68.3 | 33.3 | 34.5 | 96 |
| 2 | 9.52 | −400.5 | −68.3 | 32.5 | 34.5 | 94 |

The results in Table 3 show that the observed heat released in the production of hydrogen was 96% of the theoretical value. The 94% value from the second reading can be attributed to the heat lost to the surroundings during the time that lapsed between the readings.

The reaction has a net maximum heat production during hydrogen generation of 195.6 kCal/mole. A further 204.9 kCal/mole will be released if the hydrogen is burned with oxygen. Stated another way, 51% of the reaction energy is used to form hydrogen gas and 49% goes into the production of heat.

Having explained the preferred method for producing hydrogen gas, the following disclosure and drawings describe a preferred apparatus for carrying out the method.

Figure 1:
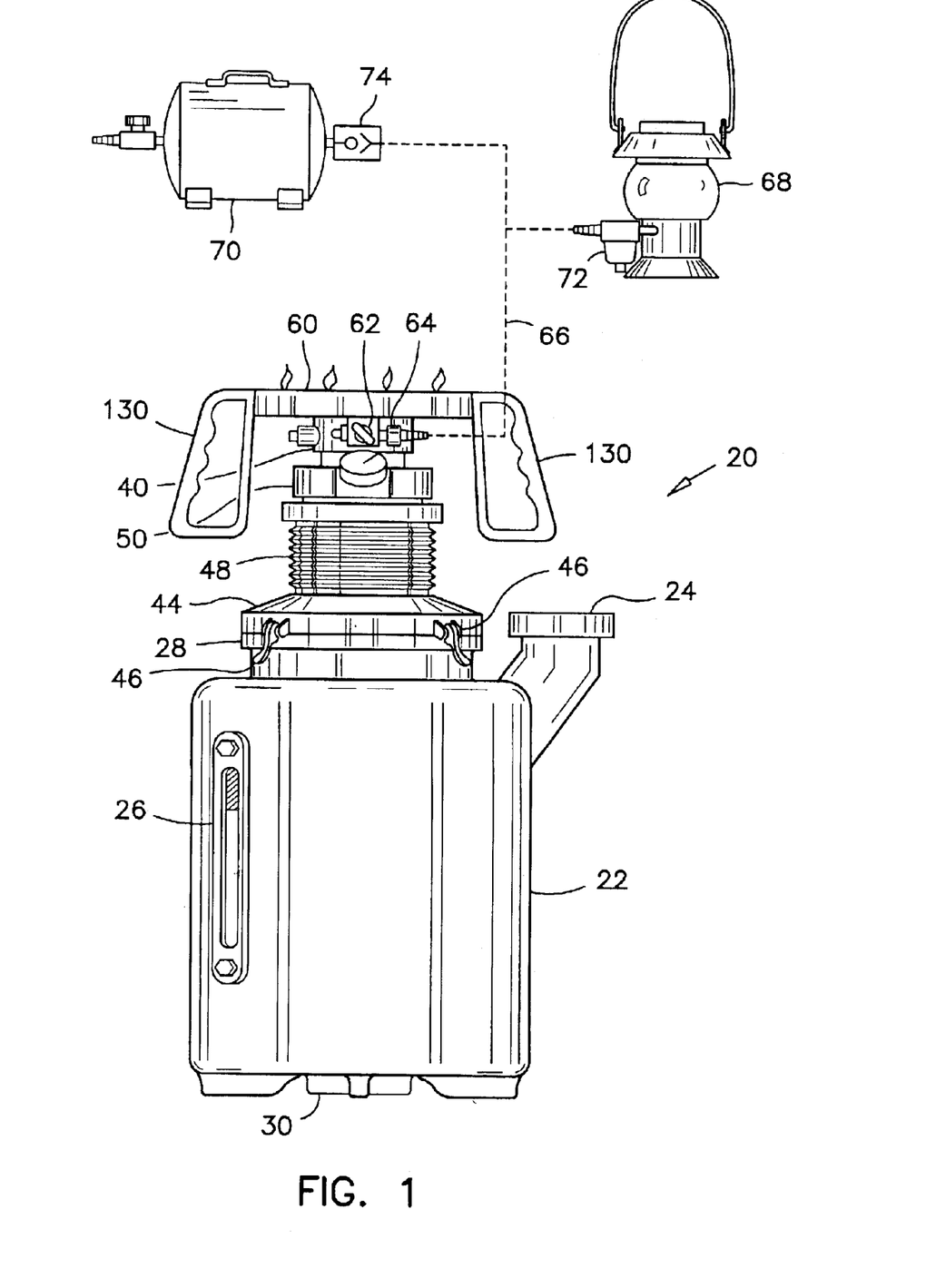
FIG. 1 is a side view of the preferred energy production apparatus, also referred to herein as the hydrogen generator.
Figure 2:
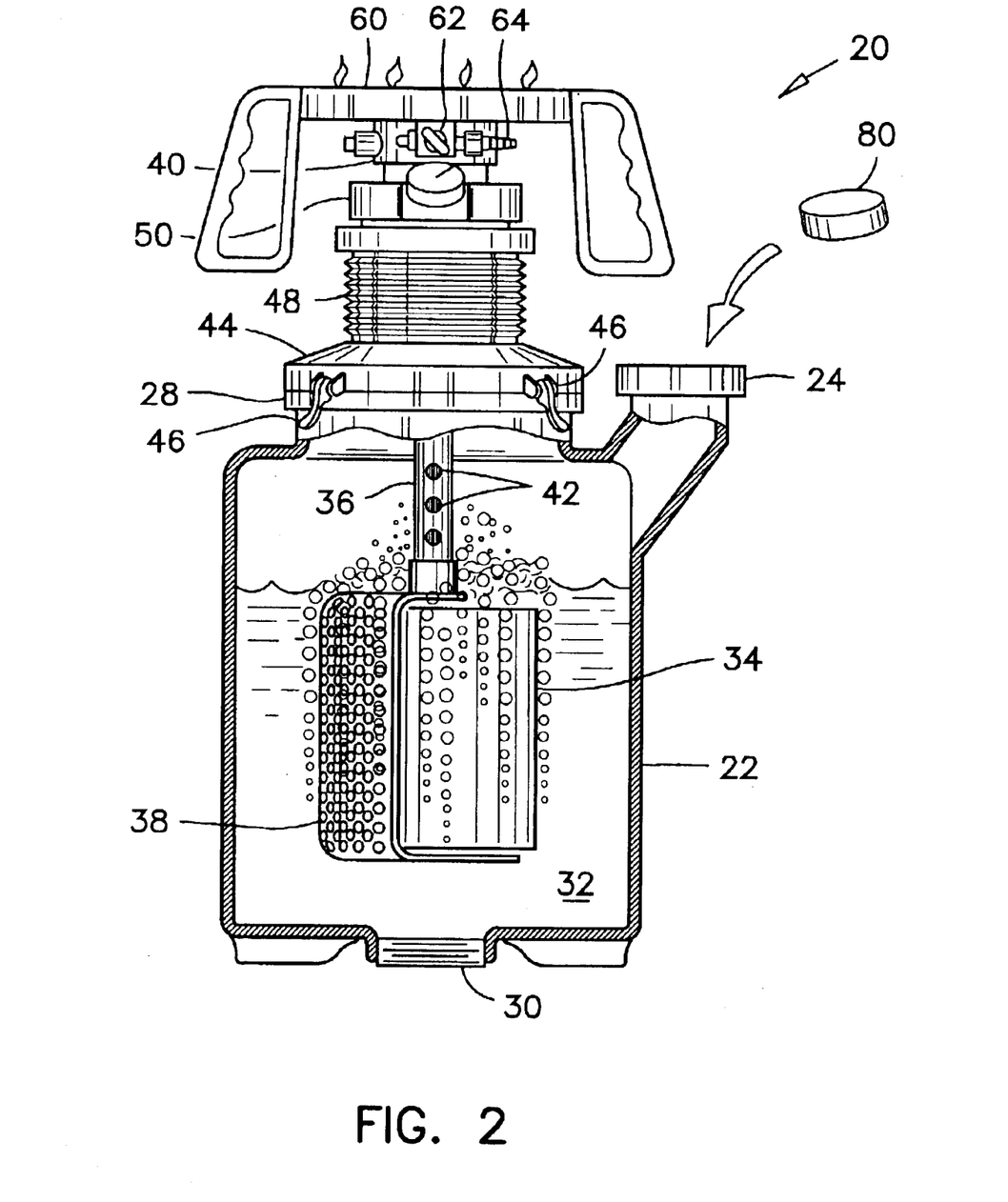
FIG. 2 is a cross-section view of the energy production apparatus illustrating a mode of operation thereof when the fuel cartridge is entirely immersed in water.

Referring firstly to FIGS. 1 and 2, an energy production apparatus according to the preferred embodiment of the present invention is illustrated therein. The energy production apparatus, also referred to herein as the hydrogen generator 20 is illustrated in these figures in its entirety. The hydrogen generator 20 uses water and aluminum particles as fuel, and sodium hydroxide (NaOH) as a catalyst and a surface conditioner to reduce the formation of oxide layers on the aluminum particles. The sodium hydroxide may be mixed or otherwise closely associated with the aluminum particles in a sufficient amount to ensure complete reaction of the aluminum particles with water in an energy production period. Further discussion on the incorporation of sodium hydroxide with the aluminum particles will be provided later, especially when making reference to FIGS. 10–13.

The hydrogen generator 20 comprises firstly a receptacle 22 having a first closable fill opening 24, a sight glass 26 for monitoring the level of water therein, and a second closable larger opening 28 in a central upper region thereof. The receptacle 22 also preferably has a cleanout bung 30 through its bottom surface to facilitate the periodic removal of the reaction byproducts such as alumina.

In use, the receptacle 22 is filled with water 32, to a level of between half and three-quarter of its capacity. A fuel cartridge 34 hanging from a vertical tube 36 is immersed into the water 32 for causing a chemical reaction to occur with the water, and for producing heat and hydrogen gas.

The fuel cartridge 34 is supported in a perforated basket 38 affixed to the vertical tube 36. The vertical tube 36 is connected to a gas handling manifold 40 mounted above the receptacle 22, and has a series of holes 42 therein for admitting the hydrogen gas into the gas handling manifold 40.

An annular cap 44 is also provided for mounting over the upper central opening 28 of the receptable. Several clasps 46 are provided around the annular cap 44 for securing the annular cap 44 in a sealing manner to the upper central opening 28. It will be appreciated that the upper central opening 28 has a dimension to accommodate the insertion of the fuel cartridge 34 and the basket 38 inside the receptacle 22. It will also be appreciated that the clasps 46 may be replaced by other closure means for quickly and easily removing the annular cap 44, for replacing a spent fuel cartridge for example.

Upon the annular cap 44, there is provided a bellows 48 having an interior region communicating with the receptacle 22 such that the expansion and retraction of the bellows are relative to the pressure inside the receptable. Atop the bellows 48, there is provided a timer mechanism 50, the operation of which will be described later. In the hydrogen generator according to the preferred embodiment 20, the gas handling manifold 40 is affixed to the upper portion of the vertical tube 36 above the timer mechanism 50.

The annular cap 44, the bellows 48, the timer mechanism 50 and the gas handling manifold 40 define with the receptable 22 a closable space for containing and controlling the hydrogen gas being generated inside the receptacle 22.

A burner plate 60 is mounted over the gas handling manifold 40. The gas handling manifold 40 has conduit means communicating with the burner plate 60. A series of orifices are provided in the burner plate 60 to allow the burning of hydrogen gas for cooking food for example in a similar manner as is known of gas stoves. Although the illustrations show a side view of the burner plate 60 it will be appreciated that the burner plate 60 is preferably a circular plate similar to those mounted on common gas stoves.

The gas handling manifold 40 also has a selector valve 62 and a gas outlet fitting 64 communicating with the selector valve 62. The selector valve 62 is operable for selectively directing the hydrogen gas to the burner plate 60 or to the outlet fitting 64.

A flexible hose for example, as represented by dash lines 66, can be connected to the outlet fitting 64 and to a gas appliance such as a lantern 68 to conveniently use the hydrogen gas, or to a gas reservoir 70 for accumulating the hydrogen gas for later use. The appliance may have a water filter 72 thereon if needed or a check valve 74 to prevent any backflow of gas into the receptacle 22 at the end of an energy production period.

Figure 14:
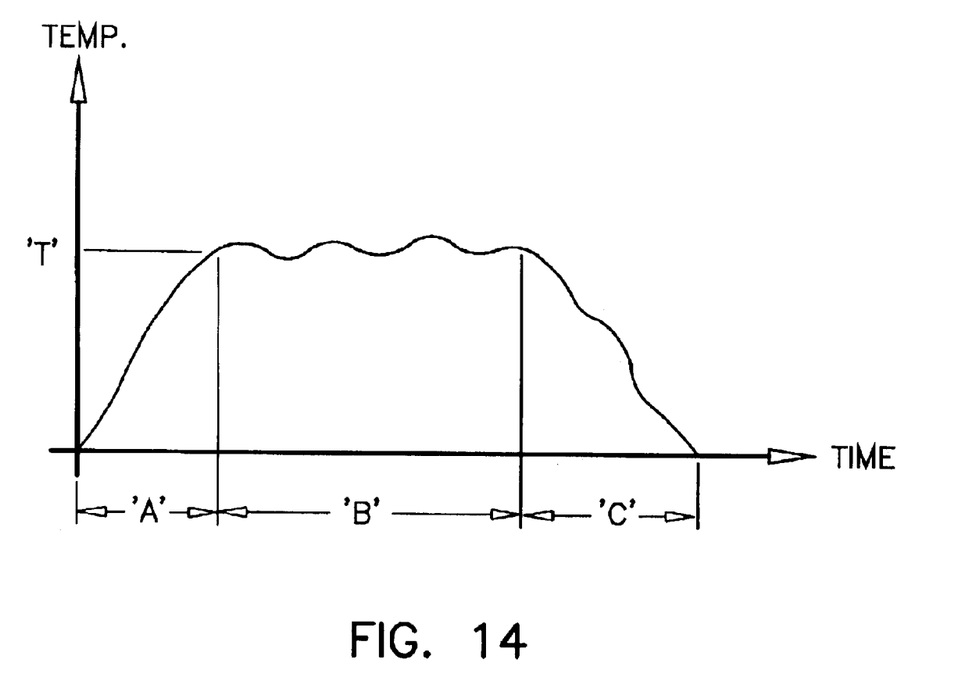
FIG. 14 illustrates a graph of temperature over time for a typical hydrogen gas production reaction.

With reference to FIGS. 2 and 14, it will be appreciated that a typical energy production period is known to have a heating phase 'A' during which the temperature inside the receptacle 22 rises; an active phase 'B' during which the temperature inside the receptacle 22 is preferably kept at around 85° C., and a cooling phase 'C' during which the reaction gradually stops. At an operation temperature 'T' during the active phase 'B' of about 85° C., the reaction has been found to be self-sustained and the hydrogen gas produced contained minimum water vapours.

The heating phase 'A' can be shortened by introducing a fuel pellet 80 inside the receptacle 22, through the fill opening 24. The fuel pellet 80 preferably contains very fine aluminum particles such as saw dust and filings for examples, compressed with waste paper bits that are impregnated with sodium hydroxide in a dry form. The small aluminum particles of the pellet 80 are known to be highly reactive with water to generate a burst of heat which causes the water temperature to approach the ideal temperature 'T' quickly, and to accelerate a reaction of the water with the larger fuel cartridge 34. Another fuel pellet 80 may also be introduced in the receptacle during the cooling phase 'C' to prolong the duration of an energy production period.

For example purposes, a fuel cartridge 34 having a volume of about one liter, that is about 500 ml of aluminum and about 500 ml of paper filler material impregnated with sodium hydroxide in a dry form, immersed in 10 liters of water is believed to be sufficient for producing heat and maintaining a reaction for about two hours, in which the active phase is about one hour, and the heating and cooling phases are about one-half hour each. It is believed that the amount of hydrogen gas produced during the active phase 'B' is sufficient for cooking food on the burner plate 60.

Figure 3:
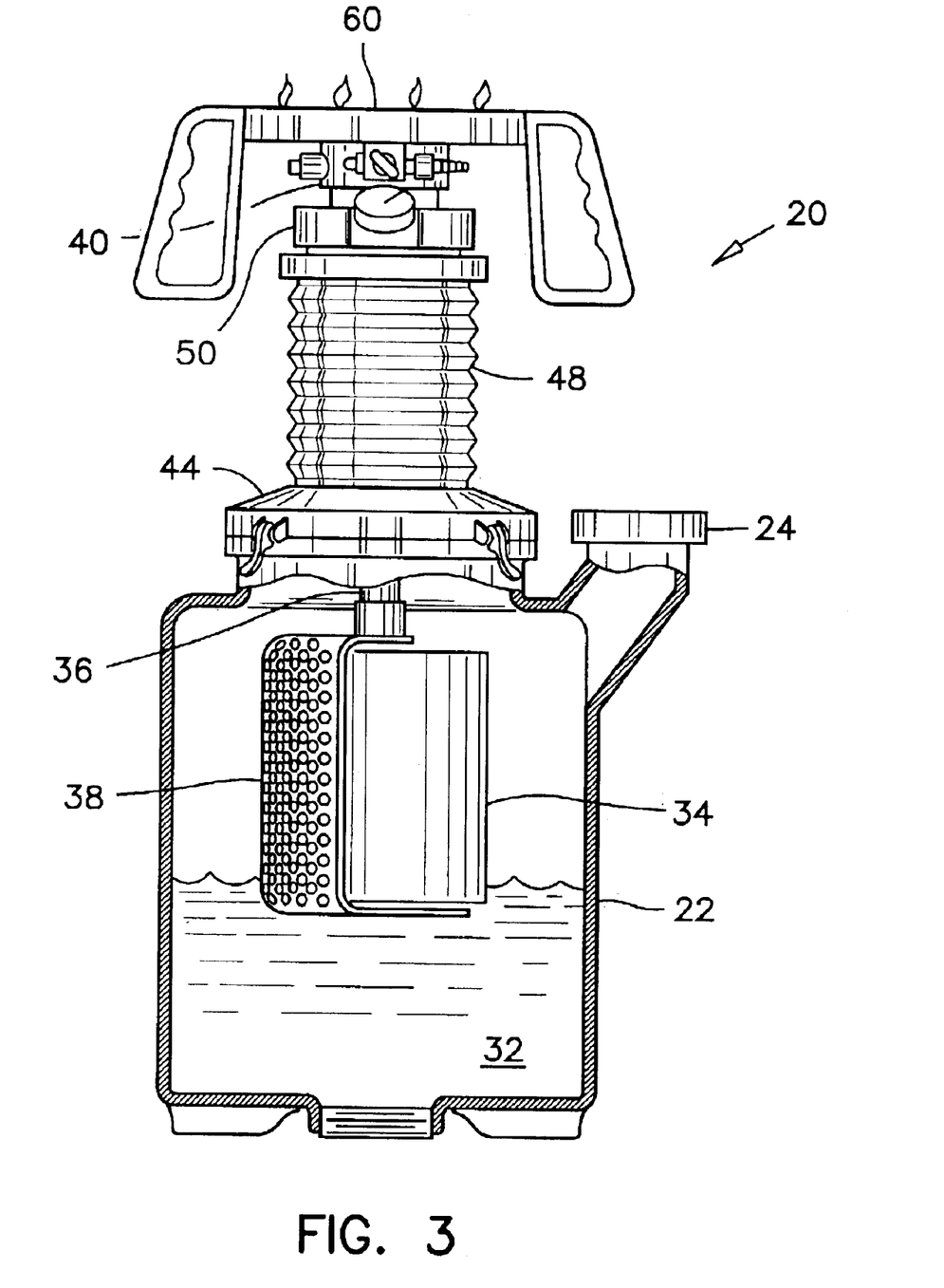
FIG. 3 is another cross-section view of the energy production apparatus with the fuel cartridge in a raised position when pressure inside the apparatus force the bellows of the apparatus to expand.

Referring now to FIG. 3, the operation of the bellows 48 is illustrated therein. When the reaction enters its active phase, the heat and pressure generated inside the receptacle 22 rise. The increase in pressure inside the receptacle 22 causes the bellows 48 to expand upward as illustrated in FIG. 3.

Because the basket 38 and the vertical tube 36 are supported to the gas handling manifold 40, and because the gas handling manifold 40 is affixed to the movable portion of the bellows 48, the expansion of the bellows 34 causes the fuel cartridge 34 to be lifted toward an upper region of the receptacle 22, and by the same doing, causes the water level to fall in the receptacle 22. The contact surface between water and the fuel cartridge 34 is thereby greatly reduced. The reaction is slowed down and the pressure and temperature inside the receptacle 22 are consequently also reduced. As temperature and pressure inside the receptacle 22 are reduced, the bellows 48 collapses to re-immerse the fuel cartridge 34 and to resume the active reaction phase.

Given the structure of the energy production apparatus 20 according to the preferred embodiment, it is believed possible to calibrate the characteristics of the bellows 48 for use with a specific size of receptacle 22 and a specific size of fuel cartridge 34, to precisely control the pressure and temperature of a reaction, such that the apparatus 20 will be practical and safe for use by the general public.

Figure 4:
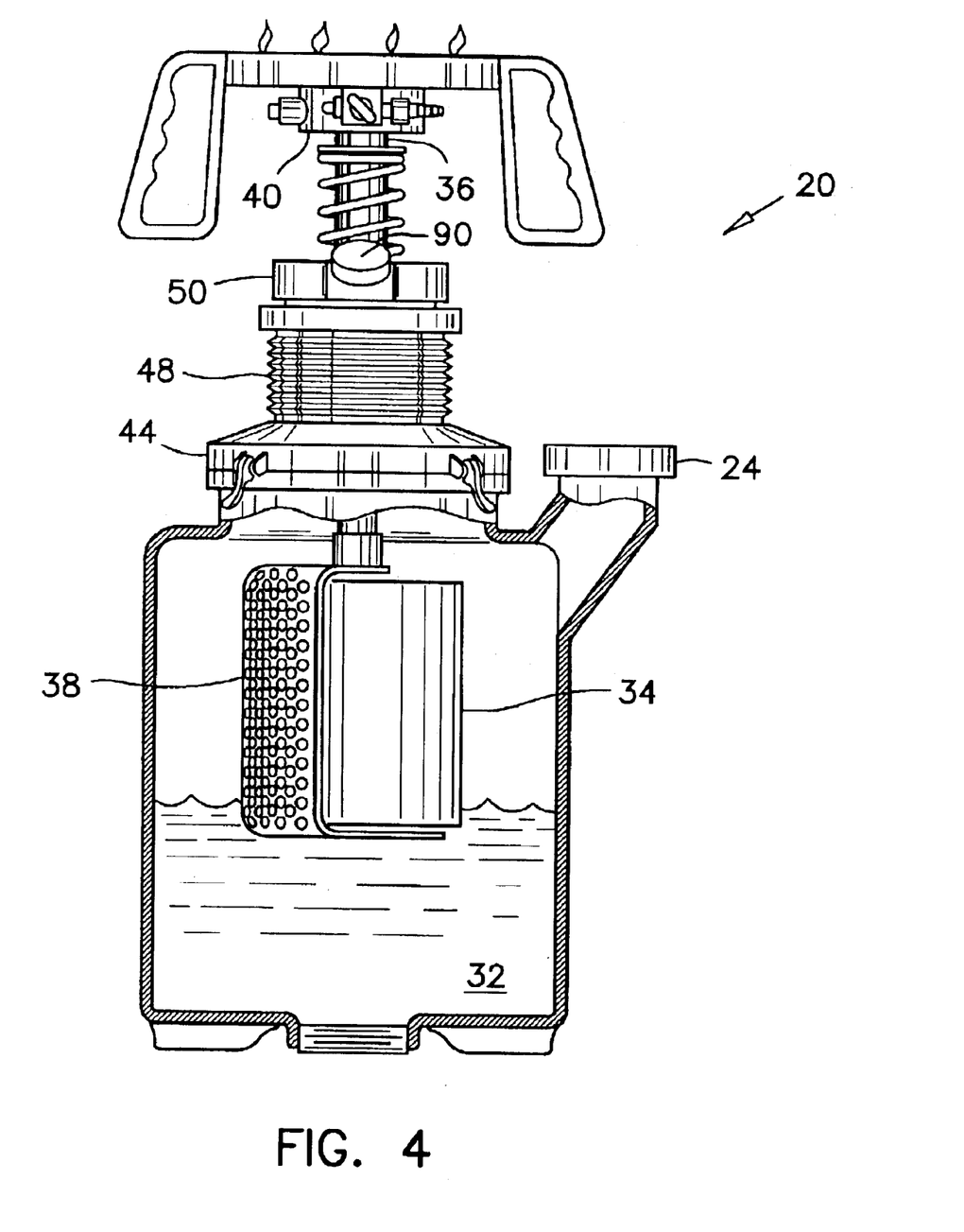
FIG. 4 illustrates yet another cross-section view of the energy production apparatus with the timer mechanism in an unlatched mode causing a spring to pull the cartridge out of the water.
Figure 8:
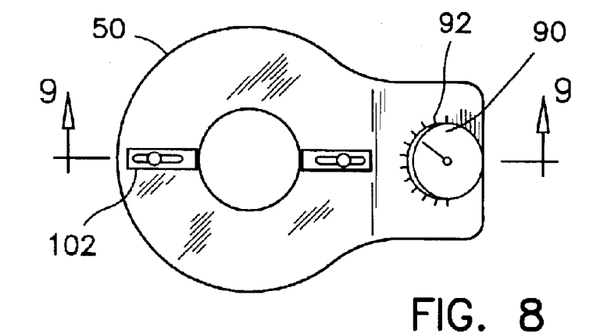
FIG. 8 is a top view of the preferred timer mechanism for use with the energy production apparatus.
Figure 9:
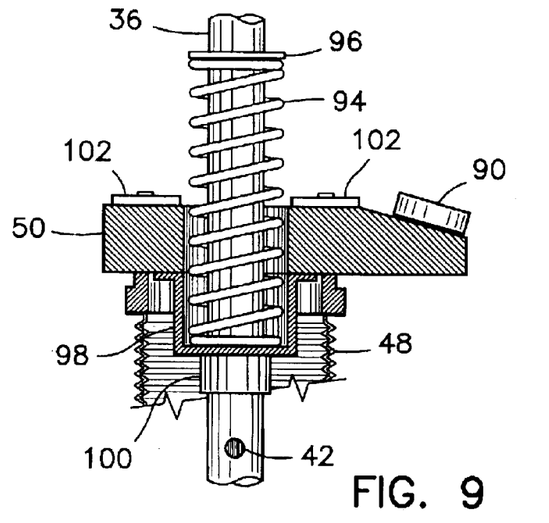
FIG. 9 is a partial cross-section view through the timer mechanism along line 9—9 in FIG. 8.

With reference to FIGS. 4, 8 and 9, the functions of the timer mechanism 50 of the hydrogen generator 20 will be explained in details. The timer mechanism 50 is provided for further improving the safety of the hydrogen generator 20. The timer mechanism 50 is used for lifting the fuel cartridge 34 above the water 32 after a set time period, even when the bellows 48 remains in a collapsed mode. The reaction inside the receptacle 22 can thereby be manually stopped or caused to terminate at a set time period by adjusting a knob 90 relative to a dial 92.

The preferred timer mechanism 50 comprises a coil spring 94 mounted over the vertical tube 36 and an annular spring-abutment plate 96 affixed to the vertical tube 36 above the spring 94 for retaining the vertical tube 36 at a fixed position relative to the upper end of the spring 94.

The spring 94 is set in a cylindrical pocket 98 extending downward through the timer mechanism 50. The depth of the pocket 98 is sufficient to accommodate the spring 94 in a compressed form when the timer mechanism is in a latched mode. A seal 100 is affixed to the bottom portion of the pocket 98 around the vertical tube 36, for allowing a sliding movement of the vertical tube 36 through the timer mechanism 50, under the action of the spring 94, and for preventing hydrogen gas from leaking out of the bellows 48.

One or more latch tabs 102 are movably connected to the timer mechanism 50 and are linked to the operation of the selector knob 90. When the burner plate 60 is pushed down to immerse the fuel cartridge 34 in water, the latch tabs 102 engage with the annular spring-abutment plate 96 to keep the spring 94 in a compressed state inside the cylindrical pocket 98.

The linkages, the clockwork and other components mounted inside the timer mechanism 50 have not been illustrated herein for being common to those knowledgeable in latches and locks. In the preferred embodiment, however, the clockwork is a mechanical device not requiring electric power. Also in the preferred embodiment, the latched tabs 102 are in a latching position when the timer knob 90 is set at any time value, and are in an unlatching position when the knob 90 is set at or reaches zero (0) time on the dial 92.

Figure 5:
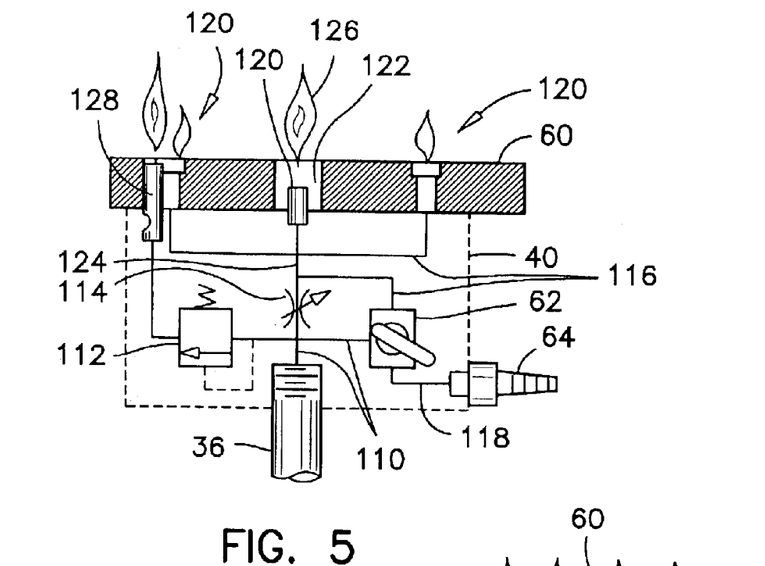
FIG. 5 is a schematic diagram of the preferred gas handling manifold and a burner plate mounted on the energy production apparatus.

Referring now to FIG. 5, the structure of the burner plate 60 and of the gas handling manifold 40 are explained therein in greater details. The outline of the gas handling manifold 40 is shown in dash lines to simplify the illustration. The gas handling manifold 40 comprises a first set of conduits 110 extending from the vertical tube 36 to the selector valve 62, to a pressure relief valve 112, and to a flow control valve 114; a second set of conduits 116 extending from the selector valve 62 to the burner plate 60; and a third conduit 118 extending from the selector valve 62 to the outlet fitting 64.

The burner plate 60 has a plurality of gas orifices 120 therein, and each gas orifice is preferably surrounded by one or more air injection holes 122 to admit oxygen around the gas orifice 120 during the burning of hydrogen gas.

In the preferred embodiment, a minimum amount of hydrogen gas is always directed to the gas orifices 120 to be burnt. The burning of this minimum amount of gas provides a visual indication of the operation of the apparatus 20, and prevents any accumulation of hydrogen gas in the room in which the apparatus is being used. For this purpose, a flow control valve 114 is provided in the gas handling manifold 40, and has a fourth conduit 124 bypassing the selector valve 62. Therefore, when the selector valve 62 is set to direct the hydrogen gas to the outlet fitting 64, a minimum amount of gas is still allowed through the flow control valve 114 and to the gas orifices 120 of the burner plate 60.

The flow control valve 114 is preferably an adjustable type such that it can be opened fully to bypass both the selector valve 62 and the pressure relief valve 112, to obtain a larger flame 126 at the center of the burner plate 60 if needed.

The pressure relief valve 112 is provided to further improve the safety of the apparatus, as will be understood from the following description. The pressure relief valve 112 monitors the pressure inside the vertical tube 36 and releases a pressure over an unsafe level, to a whistle 128 which has an outlet opening positioned near one of the gas orifices 120. The gas flowing from the whistle 128 may thereby be readily ignited by the flame above that orifice 120, to provide a visual indication of an abnormal operation of the apparatus. The sound of the whistle 128 is yet another sign to alert a user of an over pressure inside the receptacle 22, and to urge that user to set the knob 90 to zero time to cause the timer mechanism 50 to raise the fuel cartridge 34 out of the water.

Figure 6:
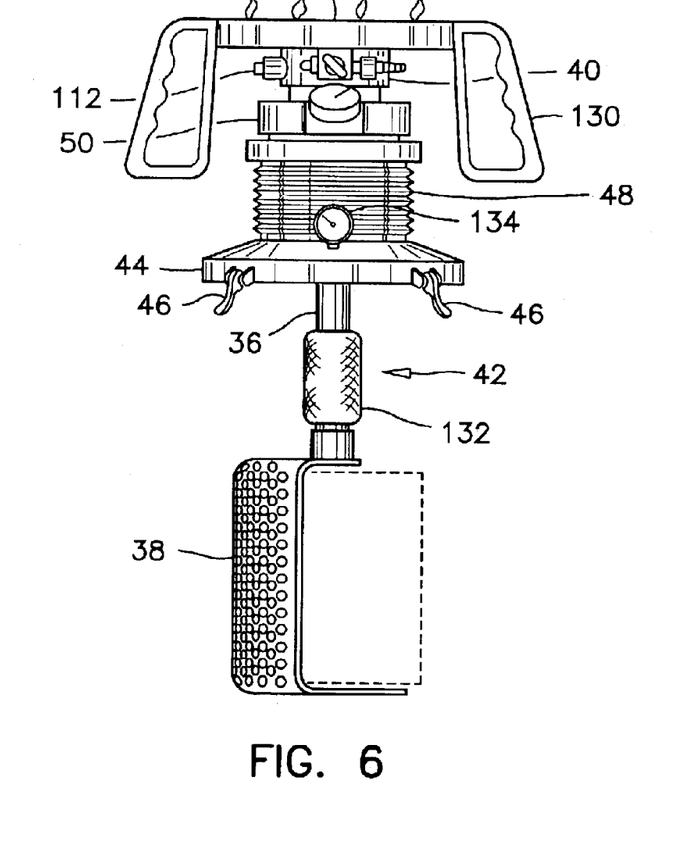
FIG. 6 is a side view of the upper fuel support portion of the energy production apparatus.

As illustrated in FIG. 6, the burner plate 60 preferably has a pair of handles 130 affixed thereto to manipulate the upper portion of the apparatus 20 when the clasps 46 are released and the basket 38 is lifted out of the receptacle 22.

In the preferred apparatus, a gas filter 132 may also be installed over the gas admitting holes 42, for preventing any accumulation of reaction byproducts inside the vertical tube 36. In other embodiments, the vertical tube 36 may be filled with an appropriate granular filtering medium for example for preventing reaction byproducts from reaching the gas handling manifold 40.

As will be appreciated, a pressure gauge 134, a temperature gauge or both, may also be provided on the annular cap 44 or at another convenient location allowing a communication with the receptacle 22, for visually monitoring the development of a reaction occurring inside the apparatus.

Figure 7:
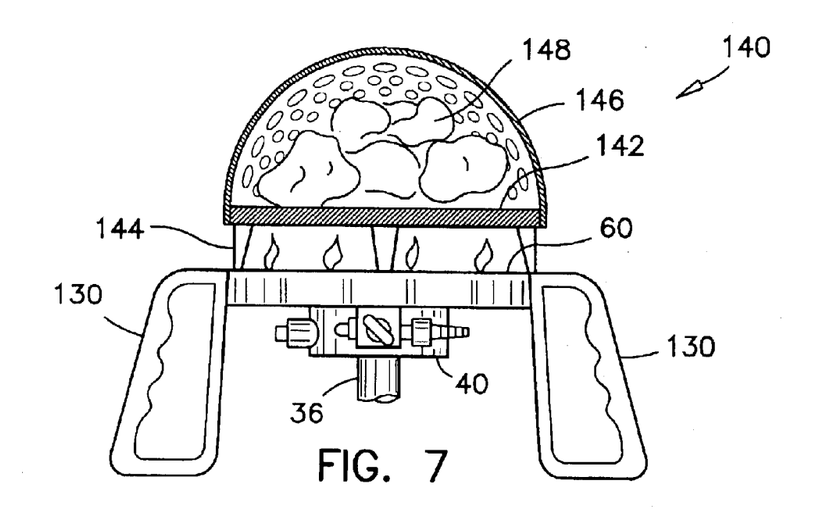
FIG. 7 illustrates a side view of a preferred burner plate and an optional heat storage device for use with the energy production apparatus.

In FIG. 7, the burner plate 60 is shown supporting a heat storage device 140, for storing heat during the operation of the apparatus 20. The heat storage device 140 is used for prolonging the beneficial effect of an energy production period when the apparatus 20 is used to heat a camp in the wilderness, or a household during a power outage period for example. The preferred heat storage device 140 comprises a copper plate 142, supported on legs 144, above the burner plate 60, and a perforated dome-shape enclosure 146 enclosing one or more rocks 148 laid over the upper portion of the copper plate 142. The heat storage device 140 is removable from the burner plate 60 and is preferably used whenever the burner plate 60 is not used for cooking food. Further, the receptacle 22 is preferably made of steel or similar heat conductive material for radiating heat during the entire energy production period.

In the preferred embodiment, the inside diameter of the bellows 48 is sufficiently large, 15–25 cm for example, and the spring 94 is calibrated such that the weight of the heat storage device 140 or the weight of a common cooking pot (not shown) which may be set on the burner plate 60 does not significantly affect the operation of the bellows 48 or of the timer mechanism 50.

Referring now to FIGS. 10–13, several arrangements are proposed for preparing the fuel elements required for use in the hydrogen generator 20 according to the preferred embodiment. The fuel bundle 34 is preferably prepared by overlaying a thin strip of aluminum 150 over a sheet of embossed paper 152 impregnated with sodium hydroxide in a dry form. The aluminum sheet and the paper layer are coiled together to form a cylindrical shape. The preferred cartridge 34 is loosely coiled such that water may be readily absorbed between the layers of the cartridge. The advantage of a loosely coiled cartridge 34 is that the water is allowed to seep into the entire cartridge at once to create an intense reaction, and reduce the duration of the heating phase 'A' of the reaction as illustrated in FIG. 14.

Figures 10, 11, 12:
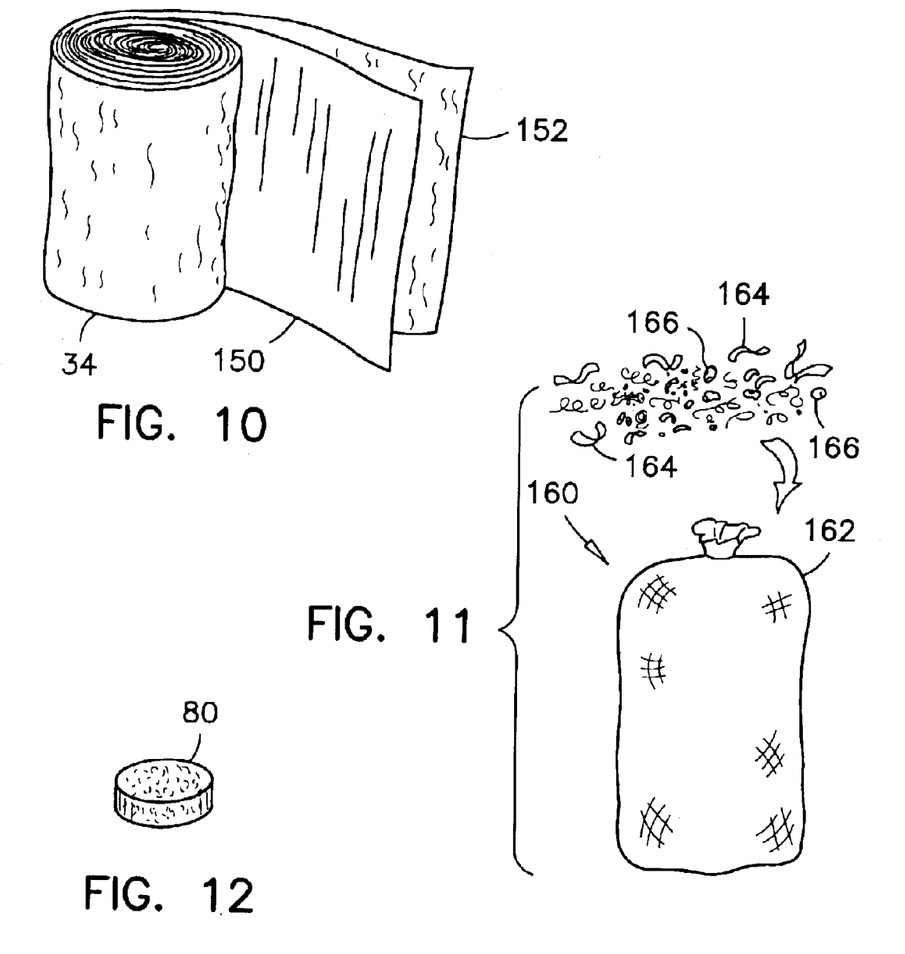
FIG. 10 illustrates a first arrangement for a fuel cartridge for use with the energy production apparatus.
FIG. 11 illustrates a second arrangement for a fuel unit for use with the energy production apparatus.
FIG. 12 illustrates one form for the fuel pellet for use with the energy production apparatus.

Another advantage of the cartridge 34 as described above is that when the layers of the coil are set vertically, the hydrogen gas generated between the layers rises up and creates a vacuum between the layers at the lower end of the cartridge 34 to admit more water from the lower end of the cartridge. This phenomenon is advantageous for wetting the aluminum strip quickly, entirely and continuously.

The preferred fuel cartridge 34 is packaged in a sealed envelope that has an indication as to its duration, potential heat energy and volume of hydrogen gas to be produced by it.

Although the fuel cartridge 34 may be better manufactured with virgin material, it will be appreciated that there are numerous economical and environmental advantages in the manufacturing of fuel elements from waste materials. Accordingly, another preferred fuel unit 160 having a loose content in a bag-like envelope is illustrated in FIG. 11. The envelope 162 is water-permeable, and the loose content comprises aluminum turning, aluminum saw dust and filings, aluminum shreds and other aluminum waste particles 164 as normally found in a metal working shop, or as available from scrap metal vendors.

It is also possible to use aluminum shreds from domestic waste containers. When the waste aluminum is obtained by shredding food or drink containers for example, the waste material is preferably pre-treated to at least partly remove a protective coating on this aluminum material.

The loose content of the fuel unit 160 also comprises waste paper bits 166 impregnated with sodium hydroxide and dried. The paper bits 166 are made of waste newsprint or similar recyclable paper waste. The paper bits 166 preferably have sizes and quantities similar to the aluminum particles, and are mixed with the aluminum particles 164. The presence of the paper bits 166 prevents the fusion of the aluminum particles 164 together and ensures a continuous absorption of water throughout the loose content of the fuel unit 160. The fuel unit 160 is also preferably manufactured and labelled as to indicate its expected energy production period.

The fuel pellet 80 as illustrated in FIGS. 2 and 12, and as previously described contains very fine aluminum particles such as saw dust and filings for example, to provide a better water contact and a more intense reaction. One or two fuel pellets 80 are preferably packaged in a sealed envelope and distributed as reaction accelerators with each fuel cartridge 34, or with each fuel unit 160 sold.

Figure 13:
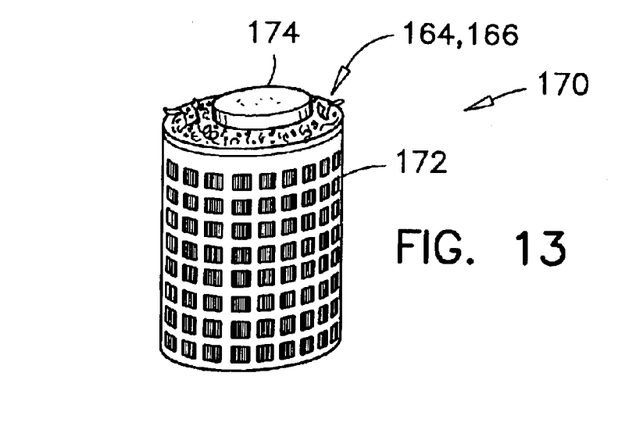
FIG. 13 illustrates a third arrangement for a fuel unit for use with the energy production apparatus.

A third preferred arrangement for a fuel element usable in the apparatus 20 according to the preferred embodiment is illustrated in FIG. 13. The fuel measure 170 is preferably comprised of a perforated container 172 filled with aluminum waste 164 and paper bits 166 as previously described.

When the energy production apparatus according to the preferred embodiment 20 is used by someone having access to aluminum waste material, and who does not want to depend on purchased fuel elements, the fuel measure 170 described herein is recommended and is preferably used with a nominal quantity of sodium hydroxide 174 set over the fuel measure 170. The sodium hydroxide 174 may be compressed into a tablet form as illustrated for easy handling and storage. It may be used in a powder form contained in a water-permeable sachet (not shown), or may be kept in a sealed container and sprinkled generously over the water 32 before introducing the fuel measure 170 into the water 32.

As to the manner of manufacture of the preferred apparatus, the same should be apparent from the above description and accompanying drawings, and accordingly further discussion relative to this aspect would be considered repetitious and is not provided.

While one embodiment of a method and of one apparatus have been described herein above, it will be appreciated by those skilled in the art that various modifications, alternate materials, compositions and equivalents may be employed without departing from the true spirit and scope of the invention. Therefore, the above description and illustrations should not be construed as limiting the scope of the invention which is defined by the appended claims.

We claim:

1. An apparatus for producing hydrogen gas, comprising:
a receptacle having an upper portion and a central inside portion;
a tube extending vertically through said upper portion and into said central inside portion for extracting hydrogen gas from inside said receptacle, said tube having a first tube end outside said receptacle and a second tube end in said central inside portion;

means mounted to said first tube end, to withdraw hydrogen gas from said receptacle as said hydrogen gas is produced in said receptacle;

a fuel element suspended to said second tube end; and a timer mechanism affixed to said upper portion and comprising a cylindrical opening there through enclosing said tube, means for suspending said tube and said fuel element to said upper portion, and a seal affixed to said cylindrical opening; said seal circling said tube and having a sliding engagement with said tube for a sealed longitudinal movement of said tube through said cylindrical opening relative to said upper portion; said timer mechanism further comprising a linear actuator having means for timely moving said tube through said cylindrical opening and through said seal, and means for raising said tube and said fuel element relative to said upper portion unconditionally of a pressure inside said receptacle.

2. The apparatus as chimed in claim 1, wherein said means to withdraw hydrogen gas comprises a gas handling manifold.

3. The apparatus as claimed in claim 2, further comprising a selector valve mounted in said gas handling manifold.

4. The apparatus as claimed in claim 3, further comprising a gas outlet fitting mounted to said gas handling manifold.

5. The apparatus as claimed in claim 2, further comprising a flow control valve mounted in said gas handling manifold.

6. The apparatus as claimed in claim 2, further comprising a whistle mounted in said gas handling manifold.

7. The apparatus as claimed in claim 6, further comprising a pressure relief valve mounted in said gas handling manifold and connected to said whistle.

8. The apparatus as claimed in claim 2, further comprising a burner plate mounted to said gas handling manifold.

9. The apparatus as claimed in claim 8, further comprising a heat storage device mounted to said burner plate.

10. The apparatus as claimed in claim 9, wherein said heat storage device comprises a copperplate mounted above said burner plate, a perforated dome mounted over said copper plate and several rocks laid on said copper plate under said dome.

11. The apparatus as claimed in claim 1, wherein said means for suspending said tube and said fuel element comprises a bellows for raising and lowering said fuel element in said central portion in response to more or less pressure inside said receptacle, and wherein a course of said bellows and a course of said linear actuator are coaxial and distinct from each other.

* * * * *